United States Patent
Keller et al.

(10) Patent No.: US 7,086,019 B2
(45) Date of Patent: Aug. 1, 2006

(54) SYSTEMS AND METHODS FOR DETERMINING ACTIVITY FACTORS OF A CIRCUIT DESIGN

(75) Inventors: S. Brandon Keller, Evans, CO (US); Gregory Dennis Rogers, Fort Collins, CO (US); George Harold Robbert, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

(21) Appl. No.: 10/647,594

(22) Filed: Aug. 25, 2003

(65) Prior Publication Data

US 2005/0050481 A1    Mar. 3, 2005

(51) Int. Cl.
G06F 17/50    (2006.01)
(52) U.S. Cl. .................... 716/4; 716/5; 716/6
(58) Field of Classification Search ............. 716/4–6; 703/14–16
See application file for complete search history.

(56) References Cited

U.S. PATENT DOCUMENTS

| | | | |
|---|---|---|---|
| 5,249,133 A | | 9/1993 | Batra |
| 5,301,318 A | | 4/1994 | Mittal |
| 5,668,732 A | * | 9/1997 | Khouja et al. ............. 702/60 |
| 5,673,420 A | * | 9/1997 | Reyes et al. ................ 716/4 |
| 5,682,320 A | * | 10/1997 | Khouja et al. ............. 716/4 |
| 5,696,694 A | * | 12/1997 | Khouja et al. ............. 716/5 |
| 5,831,869 A | | 11/1998 | Ellis et al. |
| 5,838,579 A | * | 11/1998 | Olson et al. ............... 716/2 |
| 5,903,476 A | * | 5/1999 | Mauskar et al. ........... 716/1 |
| 5,946,218 A | | 8/1999 | Taylor et al. |
| 5,949,691 A | | 9/1999 | Kurosaka et al. |
| 6,028,991 A | | 2/2000 | Akashi |
| 6,075,932 A | * | 6/2000 | Khouja et al. ............. 716/4 |
| 6,185,722 B1 | | 2/2001 | Darden et al. |
| 6,230,299 B1 | | 5/2001 | McSherry et al. |
| 6,272,671 B1 | | 8/2001 | Fakhry |
| 6,308,304 B1 | | 10/2001 | Devgan et al. |
| 6,330,703 B1 | * | 12/2001 | Saito et al. ................ 716/4 |
| 6,345,379 B1 | * | 2/2002 | Khouja et al. ............. 716/4 |
| 6,363,516 B1 | | 3/2002 | Cano et al. |
| 6,378,123 B1 | | 4/2002 | Dupenloup |
| 6,480,987 B1 | | 11/2002 | McBride |
| 6,490,717 B1 | | 12/2002 | Pederson et al. |
| 6,493,864 B1 | | 12/2002 | Liu |

(Continued)

FOREIGN PATENT DOCUMENTS

JP        07334532 A    12/1995

OTHER PUBLICATIONS

Keller, S. Brandon; Rogers, Dennis R.; Lelm, Charles A.; U.S. Appl. No. 10/706,682, Entitled: Method And Program Product For Determining Nets Requiring Detailed Electromigration And Self Heating Analysis In A Digital Integrated Circuit; Filed Nov. 12, 2003.

(Continued)

*Primary Examiner*—Vuthe Siek
*Assistant Examiner*—Naum Levin

(57) ABSTRACT

Systems, methods and software products determine activity factors of a circuit design. An activity factor is assigned to one or more node types. One or more signal nets from a netlist of the circuit design are read. The signal nets are processed to associate one of the node types with each of the signal nets. An activity factor is determined for each of the signal nets based upon node type.

18 Claims, 4 Drawing Sheets

U.S. PATENT DOCUMENTS

| | | | |
|---|---|---|---|
| 6,523,149 | B1 | 2/2003 | Mehrotra et al. |
| 6,529,861 | B1 * | 3/2003 | Patra et al. .................... 703/14 |
| 6,531,923 | B1 | 3/2003 | Burns |
| 6,587,999 | B1 | 7/2003 | Chen et al. |
| 6,598,211 | B1 | 7/2003 | Zachariah et al. |
| 6,751,782 | B1 | 6/2004 | Levin et al. |
| 6,772,404 | B1 | 8/2004 | Tanaka |
| 6,801,884 | B1 | 10/2004 | Ferreri et al. |
| 6,807,520 | B1 | 10/2004 | Zhou et al. |
| 6,836,877 | B1 | 12/2004 | Dupenloup |
| 6,931,613 | B1 | 8/2005 | Kauth et al. |
| 2002/0002701 | A1 | 1/2002 | Usami et al. |
| 2002/0010901 | A1 | 1/2002 | Otaguro |
| 2002/0023255 | A1 | 2/2002 | Karniewicz |
| 2002/0144219 | A1 | 10/2002 | Zachariah et al. |
| 2003/0051222 | A1 | 3/2003 | Williams et al. |
| 2003/0200519 | A1 | 10/2003 | Argyres |
| 2003/0208721 | A1 | 11/2003 | Regnier |
| 2003/0221173 | A1 | 11/2003 | Fisher |
| 2003/0237067 | A1 | 12/2003 | Mielke et al. |
| 2004/0044972 | A1 | 3/2004 | Rohrbaugh et al. |
| 2004/0078767 | A1 | 4/2004 | Burks et al. |
| 2004/0199880 | A1 | 10/2004 | Kresh et al. |

OTHER PUBLICATIONS

Keller, S. Brandon; Rogers, Dennis R.; Lelm, Charles A.; U.S. Appl. No. 10/706,698, Entitled: Method And Program Product For Performing Self-Heating Analysis In A Digital Integrated Circuit Through a Single Cycle Transient Simulation; Filed Nov. 12, 2003.

Keller, S. Brandon; Rogers, Dennis R.; Lelm, Charles A.; U.S. Appl. No. 10/706,376, Entitled: Method And Program For Visual Display and One-Click Repair Of Electromigration And Self Heating Design-Rule Violations In A Digital Integrated Circuit Layout Database; Filed Nov. 12, 2003.

Keller, S. Brandon; Rogers, Dennis R.; Lelm, Charles A.; U.S. Appl. No. 10/706,501, Entitled: Method And Program Product For Performing Electromigration Analysis In A Digital Integrated Circuit By Converting A Netlist To A DC Model And Performing DC Analysis Of The DC Model; Filed Nov. 12, 2003.

Keller, S. Brandon; Rogers, Dennis R.; Lelm, Charles A.; U.S. Appl. No. 10/706,526, Entitled: Method And Program Product For Performing A Worst Case Electromigration And Self Heating Analysis In A Digital Integrated Circuit With Worse-Case Superposition Of Partial Currents; Filed Nov. 12, 2003.

Keller, S. Brandon; Rogers, Dennis R.; Lelm, Charles A.; U.S. Appl. No. 10/706,692, Entitled: Method And Program Product For Performing Electromigration Analysis In A Digital Integrated Circuit Through A Single Cycle Transient Simulation; Filed Nov. 12, 2003.

Keller, S. Brandon; Rogers, Dennis R.; Lelm, Charles A.; U.S. Appl. No. 10/706,508, Entitled: Method And Program Product For Performing Self-Heating Analysis In A Digital Integrated Circuit Layout Database by Substituting Resistive Models For Active Devices; Filed Nov. 12, 2003.

Keller, S. Brandon; Rogers, Dennis R.; Robberts, George H.; U.S. Patent Application filed under EV210655516US; Entitled: Method And Program Prodcut For Determining Worst Case Currents In A Digital Integrated Circuit Through Worst-Case Superposition Of Partial Currents; Filed Jan. 30, 2004.

Keller, S. Brandon; Rogers, Dennis R.; Robberts, George H.; U.S. Patent Application filed under EV210655564US; Entitled: Systems And Methods For Re-Using Circuit Design Analysis Results; Filed Jan. 30, 2004.

Keller, S. Brandon; Rogers, Dennis R.; Robberts, George H.; U.S. Patent Application filed under EV210655581US; Entitled: System And Method For Determining Detail Of Analysis In A Circuit Design; Filed Jan. 30, 2004.

Keller, S. Brandon; Rogers, Dennis R.; Robberts, George H.; U.S. Patent Application filed under EV210655595US; Entitled: Systems And Methods That Identify Equivalent Instantiation-Specific Configuration Information For Analysis Tools; Filed Jan. 30, 2004.

Keller, S. Brandon; Rogers, Dennis R.; Robberts, George H. & Stevens, Scott Alan; U.S. Patent Application filed under EV210655520US; Entitled: System And Method To Limit Analyzed Current Flow In A Circuit Design; Filed Jan. 30, 2004.

Keller, S. Brandon; Rogers, Dennis R.; Robberts, George H.; U.S. Patent Application filed under EV210655533US; Entitled: System And Method For Processing Configuration Information; Filed Jan. 30, 2004.

Keller, S. Brandon; Rogers, Dennis R.; Robberts, George H.; U.S. Patent Application filed under EV210655555US; Entitled: System And Method For Balancing Run-Time And Result Accuracy In A Circuit Design Analysis Tool; Filed Jan. 30, 2004.

Keller, S. Brandon; Rogers, Dennis R.; Robberts, George H.; U.S. Patent Application filed under EV210655578US; Entitled: System And Method For Indicating Logic State Combinations Used During Circuit Design Analysis; Filed Jan. 30, 2004.

Keller, S. Brandon; Rogers, Dennis R.; Robberts, George H.; U.S. Patent Application filed under EV210655547US; Entitled: System And Method For Determining Control Signal Combinations For Use During Simulation Of A Stage Of A Circuit Design; Filed Jan. 30, 2004.

* cited by examiner

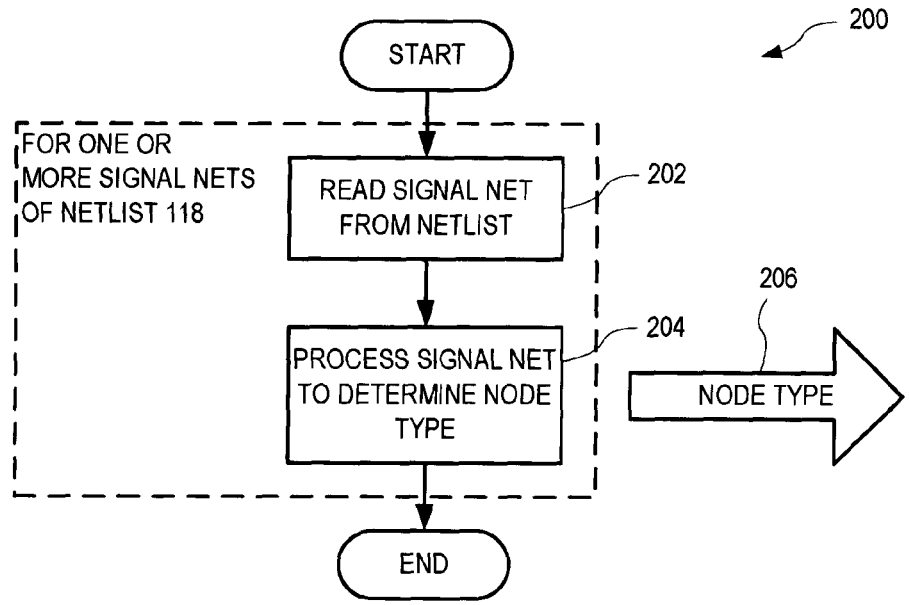

SYSTEMS AND METHODS FOR DETERMINING ACTIVITY FACTORS OF A CIRCUIT DESIGN

RELATED APPLICATIONS

The present document contains material related to the material of copending, cofiled, U.S. patent applications: U.S. patent application Ser. No 10/647,597, entitled System And Method For Determining Wire Capacitance For A VLSI Circuit; U.S. patent application Ser. No. 10/647,595, entitled System And Method For Determining Applicable Configuration Information For Use In Analysis Of A Computer Aided Design; U.S. patent application Ser. No. 10/647,687, entitled Systems And Methods Utilizing Fast Analysis Information During Detailed Analysis Of A Circuit Design; U.S. patent application Ser. No. 10/647,768, entitled System And Method For Determining A Highest Level Signal Name In A Hierarchical VLSI Design; U.S. patent application Ser. No. 10/647,606, entitled System And Method For Determining Connectivity Of Nets In A Hierarchical Circuit Design; U.S. patent application No. 10/647,596, entitled System And Method Analyzing Design Elements In Computer Aided Design Tools; U.S. patent application Ser. No. 10/647,608, entitled System And Method For Determining Unmatched Design Elements In A Computer-Automated Design; U.S. patent application Ser. No. 10/647,598, entitled Computer Aided Design Systems And Methods With Reduced Memory Utilization; U.S. patent application Ser. No. 10/647,688, entitled System And Method For Iteratively Traversing A Hierarchical Circuit Design; U.S. patent application Ser. No. 10/647,769, entitled Systems And Methods For Establishing Data Model Consistency Of Computer Aided Design Tools; U.S. patent application Ser. No. 10/647,607, entitled Systems And Methods For Identifying Data Sources Associated With A Circuit Design; and U.S. patent application Ser. No. 10/647,605, entitled Systems And Methods For Performing Circuit Analysis On A Circuit Design, the disclosures of which are hereby incorporated herein by reference.

BACKGROUND

An electronic computer aided design ("E-CAD") package uses an activity factor within a power analysis tool to determine switching power requirements associated with a signal of a Very Large Scale Integration ("VLSI") circuit design. The activity factor defines the number of transitions the signal makes during one half of a clock cycle; the clock reference signal therefore has an activity factor of one. By determining activity factors for all signals in a VLSI circuit design, the power analysis tool may calculate switching power requirements for the entire VLSI circuit design. The switching power consumed by a particular signal is dependent on the frequency of transitions made by the signal and the capacitance of the signal net carrying the signal. The higher the signal frequency, the more often the net capacitance charges and discharges, increasing the switching power requirements.

The power analysis tool uses a vector logic simulator to simulate and determine the activity factor associated with each signal net of the VLSI circuit design. This simulation may take several hours or days since the VLSI circuit design typically has billions of engineering components. The delay associated with the simulation reduces productivity; continuous lost productivity due to lengthy engineering development slows technology advancement and can result in significant costs, as well as lost business.

To reduce the time period associated with determining switching power requirements of the VLSI circuit design, an average activity factor is often estimated and applied to all signal nets of the VLSI circuit design, thereby removing the need to separately calculate activity factors for each signal net. This estimate reduces the number of calculations required in determining switching power requirements of the VLSI circuit design, but it also reduces the accuracy of the results.

SUMMARY

In one embodiment, a method determines activity factors of a circuit design. An activity factor is assigned to one or more node types. One or more signal nets from a netlist of the circuit design are read. The signal nets are processed to associate one of the node types with each of the signal nets. An activity factor is determined for each of the signal nets based upon the node type.

In another embodiment, a system determines activity factors of a circuit design. A circuit recognition tool is responsive to control by an E-CAD tool to determine node types of one or more signal nets of the circuit design. Memory stores activity factors associated with the node types, such that the activity factor is determined by node type. An analysis tool is operable to access the memory to determine an activity factor for each of the signal nets based upon node type.

In another embodiment, a system determines activity factors of a circuit design, including: means for reading one or more signal nets from a netlist of the circuit design; means for processing the signal nets to determine a node type for each of the signal nets; and means for determining an activity factor for each of the signal nets based upon node type.

In another embodiment, a software product has instructions, stored on computer-readable media, wherein the instructions, when executed by a computer, perform steps for determining activity factors of a circuit design, including: reading one or more signal nets from a netlist of the circuit design; processing the signal nets to associate a node type with each of the signal nets; and determining an activity factor for each of the signal nets based upon the node type.

BRIEF DESCRIPTION OF THE FIGURES

FIG. 4 is a flowchart illustrating one process for determining activity factors of a circuit design.

FIG. 5 is a flowchart illustrating one process for using activity factors to determine switching power requirements.

DETAILED DESCRIPTION OF THE FIGURES

Figure 1:
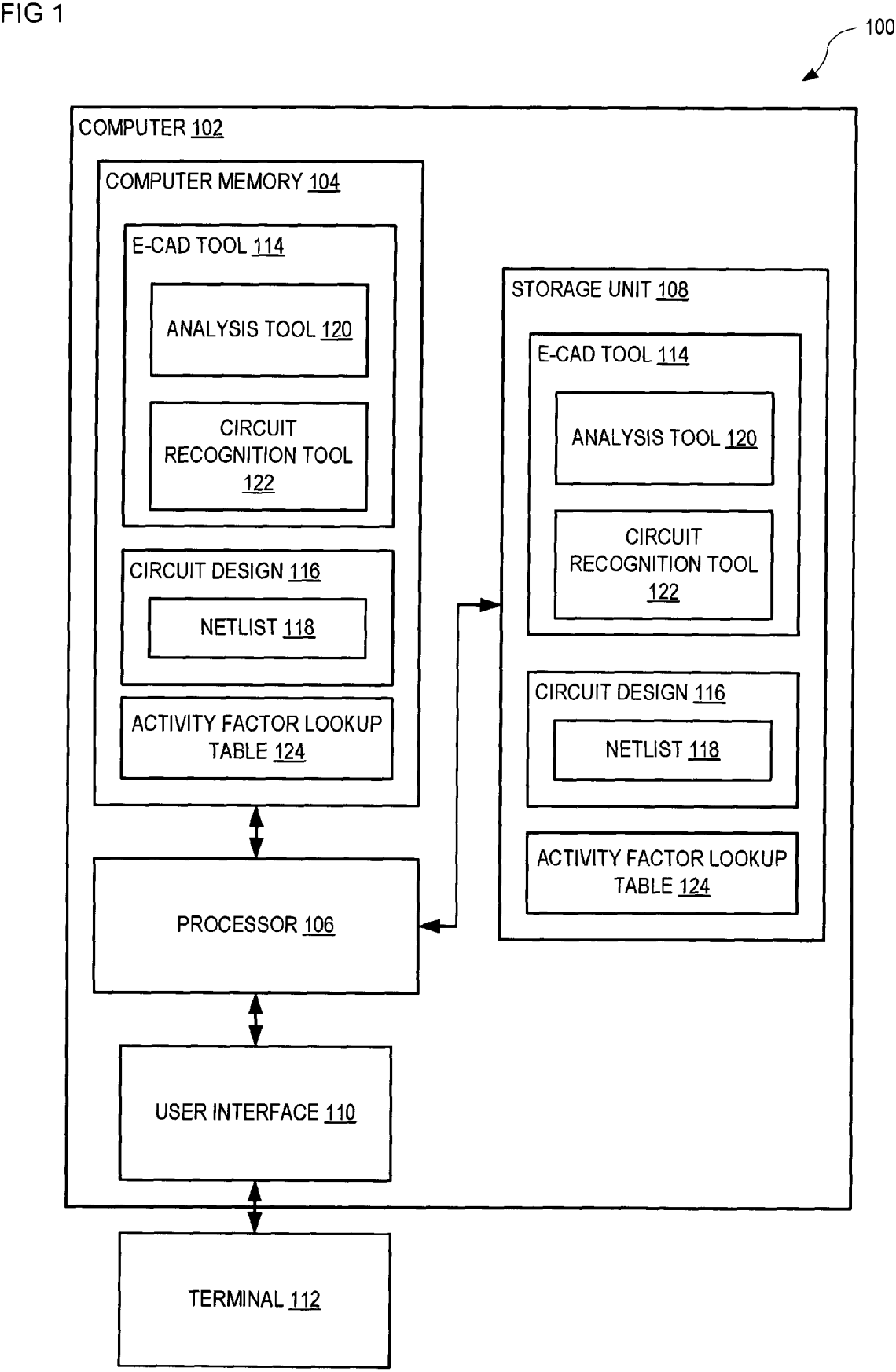
FIG. 1 is a block diagram illustrating one system for determining activity factors of a circuit design.

FIG. 1 is a block diagram illustrating one system 100 for determining activity factors of a circuit design (e.g., circuit design 116). As described below, such activity factors are for example useful in determining switching power requirements associated with part or all of the circuit design. System 100 has a computer 102 with a computer memory 104, a processor 106, a storage unit 108 and a user interface 110. Storage unit 108 may for example be a disk drive that stores programs and data of computer 102. Storage unit 108 is illustratively shown storing an E-CAD tool 114, circuit design 116, and an activity factor lookup table 124. Circuit design 116 is, for example, a very-large-scale integrated ("VLSI") circuit design created by E-CAD tool 114. E-CAD tool 114 additionally has an analysis tool 120 and a circuit recognition tool 122.

Circuit design 116 includes a netlist 118, which defines the signal nets that interconnect various design elements of circuit design 116. A "design element" is for example a capacitor, a logic gate, a resistor, a transistor, a transistor, etc. A "signal net" is a single electrical path in a circuit that has the same electrical characteristics at all of its points. Any collection of wires that carries the same signal between design elements is a signal net. If the design elements allow the signal to pass through unaltered (as in the case of a terminal), then the signal net continues on subsequently connected wires. If, however, the design elements modify the signal (as in the case of a transistor or logic gate), then the signal net terminates at that design element and a new signal net begins on the other side.

With further regard to FIG. 1, processor 106 loads E-CAD tool 114, circuit design 116 and activity factor lookup table 124 from storage unit 108 into computer memory 104, such that E-CAD tool 114 is executable by processor 106 and has access to circuit design 116 and activity factor lookup table 124, as shown. Analysis tool 120 and circuit recognition tool 122 are similarly loaded into computer memory 104. User interface 110 connects to a terminal 112 (e.g., a keyboard) external to computer 102. Through terminal 112 and user interface 110, a design engineer interacts with and controls E-CAD tool 114 (and, likewise, analysis tool 120 and circuit recognition tool 122) to perform various functions. The design engineer may for example instruct E-CAD tool 114 to use analysis tool 120 to determine switching power requirements for circuit design 116, as discussed below.

By way of illustrative operation, a design engineer instructs E-CAD tool 114, and hence analysis tool 120, to determine switching power requirements for circuit design 116. Once initiated, analysis tool 120 performs calculations, for example employing Equation 1 below, to determine the switching power for one or more signal nets of netlist 118. Equation 1 illustrates one calculation utilizing an activity factor to determine switching power required by one signal net of circuit design 116.

$$\text{Switching Power} = \text{Activity Factor} * \text{Net Capacitance} * \text{Volts}^2 * \text{Clock Frequency}, \quad \text{EQUATION 1}$$

where Switching Power is the switching power required by the signal net, Net Capacitance is the capacitance of the signal net for which the power is being calculated, Volts is the voltage difference through which the signal net switches, and Clock Frequency is the frequency of the clock on which the activity factor is based.

Analysis tool 120 utilizes circuit recognition tool 122 to determine node type for one or more signal nets of netlist 118. Circuit recognition tool 122 processes the signal nets to determine a node type that most closely resembles the signal net. For example, a node type may be static, dynamic, clock or non-toggling. Each node type has an associated activity factor; analysis tool 120 utilizes the node type to determine the activity factor for each signal net without separately simulating the signal net. Analysis tool 120 then utilizes the activity factors to characterize circuit design 116, for example allowing the design engineer to estimate switching power requirements of circuit design 116 without undo delay.

Table 1 is one example of activity factors assigned to the following node types: static, dynamic, clock and non-toggling. The activity factor for each node type may be determined from the results of a simulation performed, for example, on a vector based switch level simulator. Other node types ("other", as shown) may be defined to further increase accuracy in determining switching power requirements, as a matter of design choice.

TABLE 1

| Node type | Factor |
| --- | --- |
| Static | 0.1 |
| Dynamic | 0.2 |
| Clock | 1.0 |
| Non-Toggling | 0.0 |
| Other | TBD |

Figure 2:
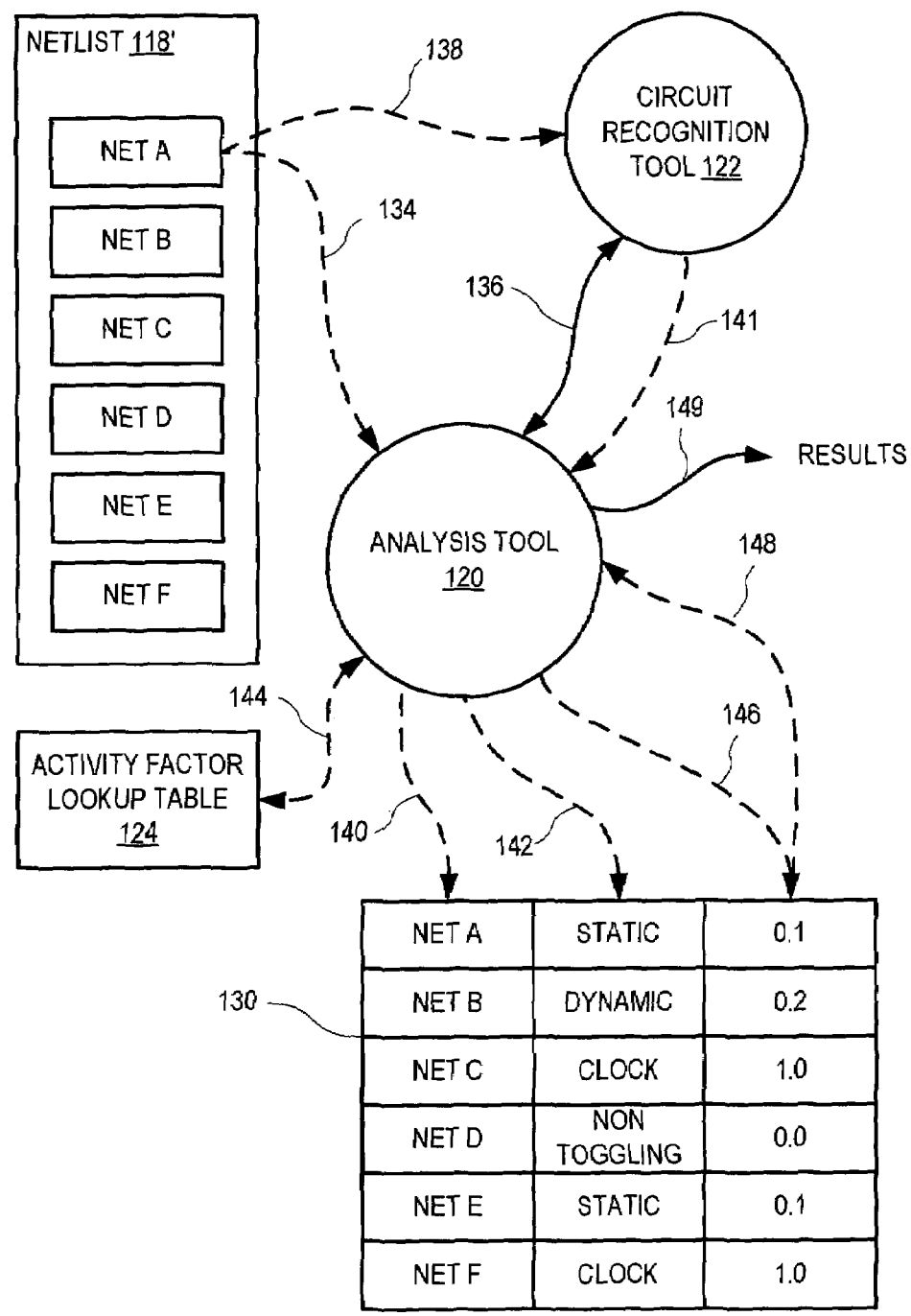
FIG. 2 is a block diagram illustrating exemplary analysis of a netlist to determine (a) node types for signal nets within the netlist and (b) activity factors associated with the signal nets.

FIG. 2 is a block diagram illustrating an exemplary analysis of a netlist 118' to determine (a) node types for signal nets defined by netlist 118' and (b) activity factors associated with the signal nets. In FIG. 2, netlist 118' is illustratively shown with six nets: net A, net B, net C, net D, net E and net F. Analysis tool 120 instructs circuit recognition tool 122 to process one or more signal nets of netlist 118'. Circuit recognition tool 122 determines a node type for each signal net. Analysis tool 120 uses this determined node type to retrieve an activity factor from activity factor lookup table 124. In one illustrative example, analysis tool 120 uses this activity factor to determine switching power requirements for selected signal nets A–F of netlist 118'; these requirements may be summed to estimate switching power requirements for some or all of circuit design 116.

In one illustrative example, analysis tool 120 reads signal net A from netlist 118', via data path 134, and stores information of signal net A in table 130, via data path 140, as shown. Analysis tool 120 instructs circuit recognition tool 122, via control path 136, to process signal net A. Circuit recognition tool 122 reads signal net A from netlist 118', via data path 138. Circuit recognition tool 122 processes signal net A to determine that signal net A is a static node type and informs analysis tool 120 of the static node type via data path 141. Analysis tool 120 then updates table 130, via data path 142, with the node type. Analysis tool 120 uses the static node type to retrieve an activity factor of 0.1 from activity factor lookup table 124, via data path 144, and updates table 130 via data path 146, as shown. Analysis tool 120 reads the activity factor from table 130 via data path 148 to determine and output (as indicated by arrow 149) a switching power requirement for signal net A. Analysis tool 120 and circuit recognition tool 122 process each selected signal net of netlist 118', as directed by the design engineer, to complete table 130. In this example, circuit recognition tool 122 determines that signal net B is a dynamic node type, signal net C is a clock node type, signal net D is a non-toggling node type, signal net E is a static node type and signal net F is a clock node type. Continuing with the example of Table 1, signal net B has an activity factor of 0.2, signal net C has an activity factor of 1.0, signal net D has an activity factor of 0.0, signal net E has an activity factor of 0.1 and signal net F has an activity factor of 1.0. Analysis tool 120 may then output results 149 with switching power requirements for all signal nets A–E.

Upon reading and fully appreciating this disclosure, those of ordinary skill in the art appreciate that Table 1 and FIG. 2 are shown illustratively, and should not be limiting. For example, in one embodiment, analysis tool 120 acquires the node type, for each net, directly from circuit recognition tool 122 and then associates activity factors with the net to determine switching power requirements. In another example, activity factor lookup table 124 may exist in a different form, with like function, without departing from the scope hereof; for example table 124 may exist as data structures within system 100, FIG. 1. Similarly, in another example, those skilled in the art appreciate that table 130 may exist in different form, with like function, without departing from the scope hereof. By way of example, in one embodiment table 130 is functionally replaced by data structures within analysis tool 120 or system 100, FIG. 1. Accordingly, the rows of table 130 may illustratively define the data structures to associate each net (e.g., net A) with its node type (e.g., "static") and its activity factor (e.g., 0.1).

A significant characteristic of VLSI and other types of circuit design is a reliance on hierarchical description. A primary reason for using hierarchical description is to hide the vast amount of detail in circuit design 116. By reducing the distracting detail to a single object that is lower in the hierarchy, one can greatly simplify many E-CAD operations. For example, simulation, verification, design-rule checking, and layout constraints can all benefit from hierarchical representation, which makes them more computationally tractable. Since many circuits are too complicated to be easily considered in their totality, a complete design is often viewed as a collection of component aggregates that are further divided into sub-aggregates in a recursive and hierarchical manner. In VLSI circuit design, these aggregates are commonly referred to as blocks (or cells). The use of a block at a given level of hierarchy is called an 'instance'.

Figure 3:
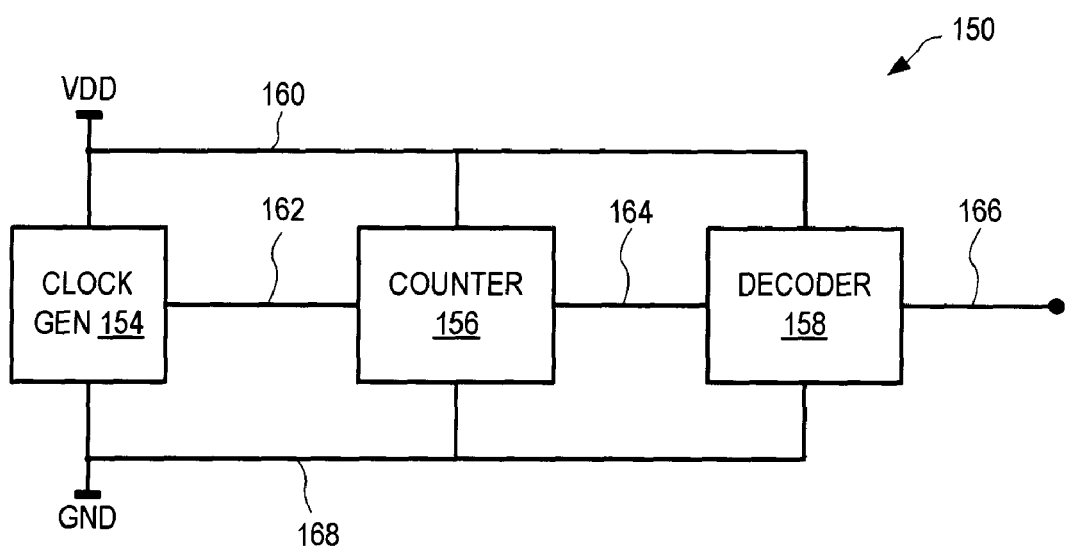
FIG. 3 is an exemplary schematic diagram of one block of a circuit design illustrating signal nets with four different node types.

FIG. 3 is an exemplary schematic diagram of one part 150 of circuit design 116, illustrating signal nets with four different node types. Part 150 has three blocks 154, 156 and 158, and five signal nets 160, 162, 164, 166 and 168. Block 154 is a clock generator that outputs a clock signal over signal net 162. Block 156 is a counter that inputs the clock signal from signal net 162 and outputs a count signal on signal net 164. Block 158 is a decoder that receives and decodes the counter signal via signal net 164 and outputs a decoded signal onto net 166. Signal net 160 and signal net 168 represent power supply connections (VDD and GND, respectively) for blocks 154, 156 and 158, and exemplify non-toggling node types. Signal net 162 is an example of a clock node type; signal net 164 is an example of a dynamic node type; signal net 166 is an example of a static node type. Circuit recognition tool 122 may utilize characteristics (e.g., signal name) of signal nets 160, 162, 164, 166 and 168 and connected design elements to determine and associate a node type with each net. In one example, circuit recognition tool 122 determines that signal net 162 is named as "clock signal" in the netlist and accordingly associates a clock type node to signal net 162.

FIG. 4 is a flowchart illustrating one process 200 for determining activity factors of circuit design 116. Process 200 is, for example, implemented by circuit recognition tool 122 when an E-CAD tool determines activity factors for one or more signal nets of a netlist (e.g., netlist 118). In step 202, circuit recognition tool 122 reads a signal net (e.g., signal net A) from the netlist. In step 204, circuit recognition tool 122 processes the signal net read in step 202 to determine a node type. The node type is stored or made available as output, indicated by arrow 206, for use by analysis tool 120. Using the example of FIG. 2 and Table 1, in step 204, circuit recognition tool 122 determines that signal net A is a static node type.

Steps 202 and 204 repeat as necessary or desired to process other signal nets within the netlist. By way of example, all signal nets of the netlist are processed to determine node types for all of design 116.

FIG. 5 is a flowchart illustrating one process 300 that utilizes the node types determined from process 200, for example to determine switching power requirements of circuit design 116. Process 300, for example, is implemented by analysis tool 120. In step 302, analysis tool 120 reads information of a signal net (e.g., signal net A) from the netlist. In step 304, analysis tool 120 reads the node type (arrow 306) determined in step 204 of process 200. Process 300 may receive the activity factor directly from circuit recognition tool 122 (arrow 206), or, for example, from one or more data structures such as set forth in table 130, FIG. 2.

In step 308, analysis tool 120 determines an activity factor based upon the node type read in step 304. In the example of FIG. 2, analysis tool 120 utilizes Table 1 to determine that signal net A has an activity factor of 0.1, based upon the 'static' node type. In step 310, analysis tool 120 uses the activity factor, determined in step 308, to perform analysis calculations (e.g., switching power requirements) for the signal net read in step 302. Equation 1 may be used in step 310. The calculation results are output, as indicated by arrow 312, and may be stored or printed for later use. Steps 302, 304, 308 and 310 repeat as necessary or desired to process other signal nets within the netlist. By way of example, all signal nets of netlist 118 are processed to determine switching power requirements for all of design 116, as output 312.

Changes may be made in the above methods and systems without departing from the scope hereof. It should thus be noted that the matter contained in the above description or shown in the accompanying drawings should be interpreted as illustrative and not in a limiting sense. The use of the activity factors by the power analysis tool is given as an example. Activity factors may also be used in other processes while remaining within the scope of the present method and system. The following claims are intended to cover all generic and specific features described herein, as well as all statements of the scope of the present method and system, which, as a matter of language, might be said to fall there between.

What is claimed is:

1. A method for determining activity factors of a circuit design, comprising:
    assigning an activity factor to one or more node types;
    reading one or more signal nets from a netlist of the circuit design;
    processing the signal nets to associate one of the node types with each of the signal nets; and
    determining an activity factor for each of the signal nets based upon node type.

2. The method of claim 1, the step of processing comprising determining a node type selected from the group of static, dynamic, clock and non-toggling.

3. The method of claim 1, the step of assigning comprising storing the activity factor within a lookup table.

4. The method of claim 1, further comprising determining switching power requirements based upon the activity factor for each of the signal nets.

5. The method of claim 4, the step of determining switching power requirements comprising using the activity factor assigned to the node type of each of the signal nets.

6. A system for determining activity factors of a circuit design, comprising:
- a circuit recognition tool responsive to control by an E-CAD tool to determine node types of one or more signal nets of the circuit design;
- memory for storing activity factors associated with the node types, the activity factor being determined by node type; and
- an analysis tool being operable to access the memory to determine an activity factor for each of the signal nets based upon node type.

7. The system of claim 6, the analysis tool being responsive to control by the E-CAD tool to analyze the circuit design using the activity factors.

8. The system of claim 6, the memory storing an activity factor lookup table, the analysis tool accessing the activity factor lookup table to determine the activity factor for each of the signal nets based upon node type.

9. The system of claim 6, further comprising means for accepting user inputs to specify the activity factors stored in the memory.

10. The system of claim 6, the node types comprising one of static, dynamic, clock and non-toggling.

11. A system for determining activity factors of a circuit design, comprising: means for assigning an activity factor to one or more node types;
- means for reading one or more signal nets from a netlist of the circuit design;
- means for processing the signal nets to determine a node type for each of the signal nets; and
- means for determining an activity factor for each of the signal nets based upon node type.

12. The system of claim 11, further comprising means for determining a node type selected from the group of static, dynamic, clock and non-toggling.

13. The system of claim 11, the means for assigning being responsive to user inputs to store activity factors associated with the node types.

14. A software product comprising instructions, stored on computer-readable media, wherein the instructions, when executed by a computer, perform steps for determining activity factors of a circuit design, comprising: means for assigning an activity factor to one or more node types;
- reading one or more signal nets from a netlist of the circuit design;
- processing the signal nets to associate a node type with each of the signal nets; and
- determining an activity factor for each of the signal nets based upon the node type.

15. The software product of claim 14, further comprising determining a node type selected from the group of static, dynamic, clock and non-toggling.

16. The software product of claim 14, further comprising storing the activity factor within a lookup table.

17. The software product of claim 14, further comprising determining switching power requirements based upon the activity factors for the signal nets.

18. The software product of claim 17, further comprising reading the activity factor for each of the signal nets.

* * * * *